United States Patent [19]

Kreula et al.

[11] 3,913,383

[45] Oct. 21, 1975

[54] METHOD AND APPARATUS FOR TESTING THE CONTENTS OF PACKAGES CONTAINING LIQUID PRODUCTS

[75] Inventors: Matti Siimoni Kreula; Tauno Vihtori Moisio, both of Helsinki, Finland

[73] Assignee: Valio Meijerien Keskusosuusliike, Helsinki, Finland

[22] Filed: Mar. 6, 1974

[21] Appl. No.: 448,646

[30] Foreign Application Priority Data
Mar. 9, 1973 Finland................................ 731/73

[52] U.S. Cl.......................................... 73/52; 73/54
[51] Int. Cl.².......................................... G01N 11/00
[58] Field of Search .......... 73/52, 54; 209/73, 74 R, 209/111.9

[56] References Cited
UNITED STATES PATENTS
3,435,664  4/1969  Harris................................. 73/52 X
3,596,501  8/1971  Forry et al............................. 73/52

*Primary Examiner*—Richard C. Queisser
*Assistant Examiner*—Joseph W. Roskos
*Attorney, Agent, or Firm*—Cushman, Darby & Cushman

[57] ABSTRACT

The invention relates to a method and an apparatus for testing sealed packages containing liquid food products having physical properties changing as a consequence of the deterioration of the product. The package to be tested is placed on a movable support which is set in a sudden movement of short duration. A characteristic dependent on the movement of the support is detected, a signal is generated in response to the detected characteristic and compared with a preselected reference signal, and a second or third signal is generated in response to the comparison to indicate either acceptance or rejection of the package.

9 Claims, 3 Drawing Figures

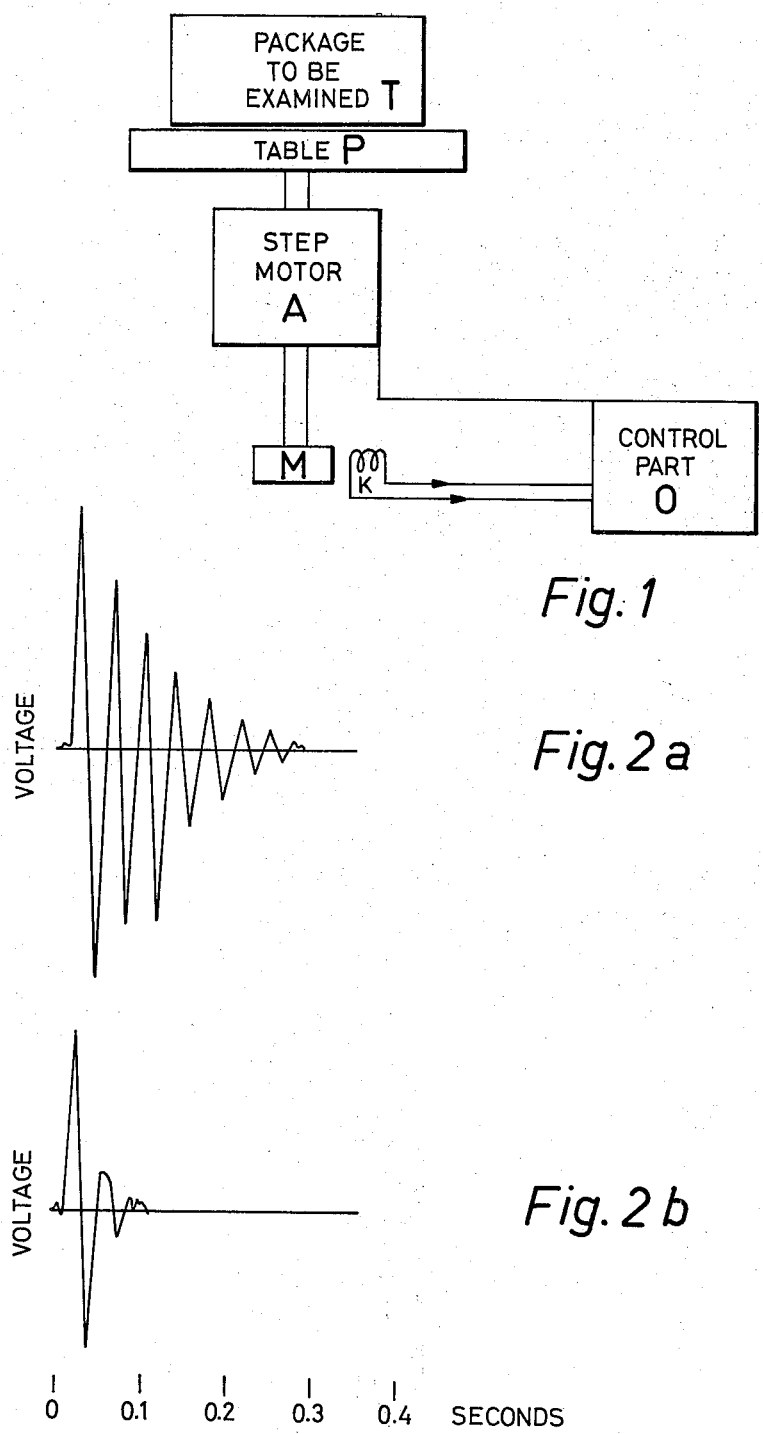

METHOD AND APPARATUS FOR TESTING THE CONTENTS OF PACKAGES CONTAINING LIQUID PRODUCTS

BACKGROUND OF THE INVENTION

Field of the Invention

The present invention relates to a method and an apparatus for testing the contents of packages containing liquid products, such as sterile milk products.

Liquid milk products are also packed in sterile packages which keep, even at room temperature, for long time periods. In normal industrial production it is, however, not possible to ensure that each package is definitely sterile, but a small number, e.g., 0.01–0.1 %, of unsterile packages remain. Usually this does not cause serious problems. The quality requirements set for certain special products, such as products to be used as food for babies or sick people, however, are exceptionally strict. In these cases it would be necessary to remove the spoiled packages before they are delivered to consumers.

It is not possible to distinguish a sterile package from an unsterile one immediately after packaging. The packages must first be kept for some time, from some hours to a few days, at a suitable temperature, in order that the microbes present in the package can increase and cause some changes in the product. Thereafter, the packages undergo a control where the spoiled ones are eliminated. The control must not harm the package or its contents.

Sterile products are usually packed in cartons the wall material of which contains, in addition to cellulose (cardboard) and plastic, an aluminum film. Such a package makes the control of the contents difficult. The testing methods based on the use of visible light, infra-red radiation, or micro-waves, are not applicable, for those types of radiation do not sufficiently penetrate the aluminum film. X-rays, gamma rays and beta rays can be used, but they detect spoilage only in some extreme cases, e.g., when a precipitate has formed at the bottom of the carton. Ultrasonic testing has been proved possible in many cases by laboratory experiments, but it has not been possible to develop a rapid mass testing method.

Packages of the said type are also so gastight that the volatile substances produced in connection with spoiling do not penetrate outside the package to such an extent that they could be detected with even the most sensitive detectors.

Spoilage due to microbes, which in milk products usually means souring, causes changes in the physical and/or physiochemical state of the product. The process may be a change in the viscosity, precipitate formation, phase separation, etc. Owing to the fat and protein they contain, milk products have a very complicated structure, and this structure easily changes as a result of bacterial action. These changes in the state of the product strongly affect the hydrodynamic behaviour of the contents of the package.

SUMMARY OF THE INVENTION

The purpose of the present invention is to provide a method for testing the contents of packages containing liquid products and especially milk products packed in a sterile manner, a method applicable to commerical use. The invention is based on the above knowledge of the changes in the hydrodynamic behaviour of such products as a result of bacterial action. According to the invention a package is placed on a movable support, said support is set in a sudden motion of short duration, a characteristic is detected dependent on one of the factors consisting of acceleration of said support upon starting of said motion and oscillation of said support before a complete standstill upon stopping of said motion, a first signal is generated in response to said detected characteristic, said first signal is compared with a preselected reference signal, and one of second and third signals is generated in response to said comparison, said second and third signals indicating acceptance and rejection respectively of said package. According to a preferred embodiment of the invention said detected characteristic belongs to the group consisting of electromagnetically induced voltage, frequency attenuation and waveform of said voltage, and combinations thereof.

The purpose of the invention is also to provide an apparatus for testing the condition of contents of sealed packages containing liquid food products having physical properties changing as a consequence of the deterioration of said products. The apparatus according to the invention comprises a rotatable support for a package to be tested, a step motor connected to said support, means for energizing said step motor for a preselected short time period, a magnet attached to the shaft of said step motor, an electromagnetic coil for inducing a voltage in response to the movement of said magnet during said time period, an electronic control device for evaluating said voltage, for generating a first signal in response to said evaluated voltage, for comparing said first signal with a predetermined reference signal and for generating one of second and third signals in response to said comparison, said second and third signals indicating acceptance and rejection respectively of said package, and means responding to said second and third signals respectively for removing said package from said support along different routes.

BRIEF DESCRIPTION OF THE DRAWING

The invention is described below in more detail with reference to the enclosed drawing. In the drawing, FIG. 1 shows schematically an apparatus according to the invention, and FIGS. 2a and 2b show examples of the obtained results of the tests.

DESCRIPTION OF THE PREFERRED EMBODIMENT

The package T to be controlled is placed on a table P, which must be such that the package stays in place when the table turns. The table is attached to the shaft of a step motor A. At the other end of the shaft there is a small magnet M: the movement of the magnet induces a voltage in a coil K. In addition, the device includes an electronic control device O with which the step motor A is controlled and the voltage induced in the coil K is analyzed. In automatic mass control, it is naturally also necessary to have an apparatus which feeds the packages onto the table P and away from it along different routes, depending on whether the package has been accepted or rejected in the test.

The operations involved in the control are as follows: A package is placed on the table P and an actuating signal is given to the step motor. Then the step motor turns through a small angle, e.g., 7.5°, and stops. The stop is not sudden but the moving parts oscillate on both sides of the final equilibrium position before stopping. This is because the slowness of the mass of the moving parts tends to continue the movement past the equilibrium position while the magnetic forces of the step motor tend to return the moving parts to the final equilibrium position. This oscillation induces a corresponding voltage in the coil K. A considerable part of the total mass of the moving parts consists of that portion of the package to be tested. Consequently, the frequency, attenuation, and wave-form of the oscillation about the equilibrium position depend on the contents of the package. FIG. 2a shows the voltage obtained from the coil K when inspecting a normal sterile package. FIG. 2b shows the voltage when inspecting a corresponding package with soured contents. On the time axis of the figues, O indicates the moment at which the step motor receives an actuating signal. By measuring the voltage received from the coil K within the time range 0.10–0.30 seconds after the actuating signal, sufficient information on the condition of the package is received in this case. A normal package gives a high voltage, while a spoiled package gives hardly any voltage.

This testing apparatus has the advantage that the testing conditions can be varied widely by controlling the electronic part. Thus, the test can be easily optimized for different types of packages and their contents. The step angle of the motor A can be varied even when using the same motor. The form of the current pulses which control the motor can be varied and the angle acceleration and deceleration can be thereby affected. It is possible to use two steps instead of one either in the same direction of reciprocally. By experimentally seeking the correct test conditions, the test proved reliable in all the cases investigated even though it was based only on measuring the mean of the voltage received from the coil K within a predetermined time range.

It was possible to prove empirically that if the voltage received from the coil K is analyzed in regard to its frequency, attenuation, and waveform, much more information is obtained with the device about the condition of the contents of the package. A mere change in the viscosity, percipitate formation, the package having been left less than full at the filling stage, etc., each cause specific changes in the form of the oscillation measured.

In the method based on the step motor, the detection of the oscillation, e.g., 20 Hz, takes time. However, some 6000–8000 packages per hour can be controlled with one device. In some cases, the necessary information can be obtained by merely measuring the angle acceleration of the step motor at the start. In such a case the control is much more rapid and mainly dependent on the rapidity of the operation of the automatic package conveyors.

The method according to the invention is not limited to the use of the device described above. Thus, an extremely simple testing system can be obtained so that the package to be controlled is placed to stand on a plate the oscillation of which can be measured with, for example, a magnetic gauge, a piezoelectric pick-up, or a strain gauge. For the test, the package is caused to overturn and the oscillation created in the plate by the fall is measured. This method is, however, more difficult to optimize according to the package type than the one described above.

An extremely simple manually operated variation of the testing device can also be made. The step motor can be replaced with a spring or a permanent magnet. A small microammeter provided with a rectifier is sufficient for measuring the voltage obtained from the coil K. Slight symptoms of spoilage cannot be detected in the product by means of such a device, but fully spoiled ones can be separated from the normal ones. On arrival at a retail store or the place of consumption such sterile packages are, however, either in perfect condition or completely spoiled so that the device is fully practicable in this sense.

What is claimed is:

1. An apparatus for testing the condition of the contents of sealed packages containing liquid food products having physical properties changing as a consequence of the deterioration of said products, comprising a rotatable support for a package to be tested, a step motor connected to said support, means for energizing said step motor for a preselected short time period, a magnet attached to the shaft of said step motor, an electromagnetic coil for inducing a voltage in response to the movement of said magnet during said time period, an electronic control device for evaluating said voltage, for generating a first signal in response to said evaluated voltage, for comparing said first signal with a predetermined reference signal and for generating one of second and third signals in response to said comparison, said second and third signals indicating acceptance and rejection respectively of said package, and means responding to said second and third signals respectively for removing said package from said support along different routes.

2. A method of testing the condition of the contents of sealed packages comprised of lined cardboard or plastics, said packages containing liquid food products having physical properties which change as a consequence of the deterioration of said products, comprising the steps of:

placing a package on a movable support, setting said movable support into sudden motion by engaging suitable drive means with said movable support, detecting the hydrodynamic behavior of said liquid product caused by the acceleration of said movable support upon the initiation of said motion, terminating the setting of said movable support into motion by disengaging said drive means from said movable support, detecting the oscillation of said movable support prior to the complete stopping of motion of said movable support, generating an electromagnetically induced voltage in response to said detected behavior caused by acceleration and the detected oscillation of said movable support, comparing said induced voltage with a preselected reference voltage, and generating one of a plurality of secondary signals in response to said step of comparing wherein a first signal of said plurality of secondary signals indicates acceptance of said package and a second signal of said plurality of secondary signals indicates rejection of said package.

3. A method as claimed in claim 2 wherein said comparing comprises comparing the characteristics of the magnitude of said voltage with the characteristics of said reference voltage.

4. A method as claimed in claim 2 wherein said comparing comprises comparing the characteristics of the frequency attenuation of said voltage with the characteristics of said reference voltage.

5. A method as claimed in claim 2 wherein said comparing comprises comparing the characteristics of the wave form of said voltage with the characteristics of said reference voltage.

6. A method as claimed in claim 2 wherein said comparing comprises comparing the characteristics of the magnitude and the frequency attenuation of said voltage with the characteristics of said reference voltage.

7. A method as claimed in claim 2 wherein said comparing comprises comparing the characteristics of the magnitude and the wave form of said voltage with the characteristics of said reference voltage.

8. A method as claimed in claim 2 wherein said comparing comprises comparing the characteristics of the waveform and the frequency attenuation of said voltage with the characteristics of said reference voltage.

9. A method as claimed in claim 2 wherein said comparing comprises comparing the characteristics of the magnitude, wave form and frequency attenuation of said voltage with the characteristics of said reference voltage.

* * * * *